United States Patent
Lee et al.

(10) Patent No.: US 9,720,438 B2
(45) Date of Patent: Aug. 1, 2017

(54) CLOCK SWITCH DEVICE AND SYSTEM-ON-CHIP HAVING THE SAME

(71) Applicant: SAMSUNG ELECTRONICS CO., LTD., Suwon-si (KR)

(72) Inventors: June-Hee Lee, Yongin-si (KR); Bong-Kyu Kim, Suwon-si (KR); Dong-Chul Choi, Yongin-si (KR); Gun-Il Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/635,145

(22) Filed: Mar. 2, 2015

(65) Prior Publication Data

US 2016/0041578 A1 Feb. 11, 2016

(30) Foreign Application Priority Data

Aug. 6, 2014 (KR) .................. 10-2014-0101069

(51) Int. Cl.

| *G06F 1/12* | (2006.01) |
|---|---|
| *G06F 13/42* | (2006.01) |
| *G06F 1/10* | (2006.01) |
| *G06F 13/40* | (2006.01) |
| *G06F 1/14* | (2006.01) |

(52) U.S. Cl.
CPC .................. *G06F 1/10* (2013.01); *G06F 1/12* (2013.01); *G06F 13/4022* (2013.01); *G06F 1/14* (2013.01)

(58) Field of Classification Search
CPC ...................................... G06F 1/12; G06F 1/10
See application file for complete search history.

(56) References Cited

U.S. PATENT DOCUMENTS

| 5,315,181 | A | * | 5/1994 | Schowe | G06F 1/08 |
|---|---|---|---|---|---|
| | | | | | 326/93 |
| 6,049,236 | A | * | 4/2000 | Walden | G06F 1/08 |
| | | | | | 327/115 |
| 6,809,556 | B1 | | 10/2004 | Bronfer et al. | |
| 7,180,336 | B2 | | 2/2007 | Lee et al. | |
| 7,471,120 | B2 | * | 12/2008 | Lou | G06F 1/04 |
| | | | | | 327/407 |
| 7,671,633 | B2 | | 3/2010 | Kuhn | |

(Continued)

FOREIGN PATENT DOCUMENTS

| KR | 10-2002-0072049 A | 9/2002 |
|---|---|---|
| KR | 10-0674910 B1 | 1/2007 |
| KR | 10-2008-0101495 A | 11/2008 |

*Primary Examiner* — Phil Nguyen
(74) *Attorney, Agent, or Firm* — Sughrue Mion, PLLC

(57) ABSTRACT

A clock switch device includes a controller and a switching circuit. The controller sets a clock switch period using a control signal when a logic level of a mode signal is changed. The switching circuit receives a first clock signal, a second clock signal and an auxiliary clock signal. The switching circuit, based on the control signal, outputs one clock signal between the first clock signal and the second clock signal as a glitch free clock signal before the clock switch period, stops outputting the one clock signal and outputs the auxiliary clock signal as the glitch free clock signal during the clock switch period, and stops outputting the auxiliary clock signal and outputs another clock signal between the first clock signal and the second clock signal as the glitch free clock signal after the clock switch period.

20 Claims, 10 Drawing Sheets

10a

(56) References Cited

U.S. PATENT DOCUMENTS

| | | | |
|---|---|---|---|
| 7,911,239 B2 | 3/2011 | Saint-Laurent et al. | |
| 8,086,989 B2 | 12/2011 | Hailu et al. | |
| 8,381,010 B2 | 2/2013 | Geairon et al. | |
| 2002/0125914 A1* | 9/2002 | Kim | H03K 5/1252 326/93 |
| 2002/0135408 A1* | 9/2002 | Chiu | G06F 1/08 327/145 |
| 2003/0006808 A1* | 1/2003 | Weng | H03L 7/0814 327/99 |
| 2005/0270073 A1* | 12/2005 | Lee | G06F 1/12 327/99 |
| 2007/0096774 A1* | 5/2007 | Yang | G06F 1/08 327/99 |
| 2007/0290725 A1* | 12/2007 | Saint-Laurent | H04L 7/0083 327/99 |
| 2008/0008282 A1* | 1/2008 | Ikeda | G06F 1/04 375/371 |
| 2008/0094113 A1* | 4/2008 | Kuan | H03K 5/1506 327/117 |
| 2008/0258794 A1 | 10/2008 | Gao et al. | |
| 2009/0267674 A1* | 10/2009 | Hyun Hwang | G11C 7/222 327/295 |
| 2010/0001767 A1* | 1/2010 | Shikata | G06F 1/08 327/99 |
| 2010/0318830 A1* | 12/2010 | Tsuchizawa | G01R 31/3171 713/375 |
| 2011/0298502 A1* | 12/2011 | Chen | G06F 1/08 327/144 |
| 2013/0043905 A1 | 2/2013 | Langadi | |

\* cited by examiner

CLOCK SWITCH DEVICE AND SYSTEM-ON-CHIP HAVING THE SAME

CROSS-REFERENCE TO RELATED APPLICATION

This application claims priority from Korean Patent Application No. 10-2014-0101069, filed on Aug. 6, 2014 in the Korean Intellectual Property Office, the disclosure of which is herein incorporated by reference in its entirety.

BACKGROUND

1. Field

Example embodiments relate to an electronic device, and more particularly to a clock switch device and a system-on-chip including the clock switch device.

2. Description of the Related Art

Generally, a system-on-chip operates in synchronization with a clock signal having a relatively high frequency in a high speed mode, and operates in synchronization with a clock signal having a relatively low frequency in a low speed mode.

Therefore, a clock switch device is required for the system-on-chip to switch between the high speed mode and the low speed mode.

However, if a glitch is included in an output clock signal that is output from the clock switch device during mode switching, a logic circuit, which is operated based on the output clock signal, may operate incorrectly.

SUMMARY

Some example embodiments are directed to provide a clock switch device that outputs a clock signal without a glitch.

Some example embodiments are directed to provide a system-on-chip including the clock switch device.

According to an example embodiment, there is provided a clock switch device which may include a controller and a switching circuit. The controller may set a clock switch period using a control signal when a logic level of a mode signal is changed. The switching circuit may receive a first clock signal, a second clock signal and an auxiliary clock signal. The switching circuit, based on the control signal, may output one clock signal between the first clock signal and the second clock signal as a glitch free clock signal before the clock switch period, stop outputting the one clock signal and outputs the auxiliary clock signal as the glitch free clock signal during the clock switch period, and stop outputting the auxiliary clock signal and outputs another clock signal between the first clock signal and the second clock signal as the glitch free clock signal after the clock switch period.

One of the first clock signal and the second clock signal may stop toggling when the mode signal is at a first logic level.

The controller may activate a first selection signal during the clock switch period when the logic level of the mode signal is changed, change a logic level of a second selection signal while the first selection signal is activated, and generate a switch control signal based on the logic level of the mode signal.

The controller may maintain the switch control signal in a deactivated state when the mode signal transitions from a first logic level to a second logic level, and activate the switch control signal during the clock switch period when the mode signal transitions from the second logic level to the first logic level.

The controller may maintain the switch control signal in a deactivated state when the first clock signal keeps toggling after the mode signal transitions from a first logic level to a second logic level, and activate the switch control signal during the clock switch period when the first clock signal stops toggling after the mode signal transitions from the first logic level to the second logic level. The controller may maintain the switch control signal in the deactivated state when the second clock signal keeps toggling after the mode signal transitions from the second logic level to the first logic level, and activate the switch control signal during the clock switch period when the second clock signal stops toggling after the mode signal transitions from the second logic level to the first logic level.

The controller may generate the first selection signal, the second selection signal and the switch control signal in synchronization with the auxiliary clock signal.

The switching circuit may include a normal multiplexer configured to output one of the first clock signal and the second clock signal as a mux clock signal based on the logic level of the second selection signal, and a glitch free multiplexer configured to output the mux clock signal as the glitch free clock signal while the first selection signal is maintained at a deactivated state, to stop outputting the mux clock signal and to output the auxiliary clock signal as the glitch free clock signal based on the switch control signal when the first selection signal is activated, and to stop outputting the auxiliary clock signal and to output the mux clock signal as the glitch free clock signal when the first selection signal is deactivated.

When the first selection signal is activated, the glitch free multiplexer, based on the switch control signal, may stop outputting the mux clock signal at a time when the mux clock signal is at a logic low level and output the auxiliary clock signal as the glitch free clock signal at a time when the auxiliary clock signal is at the logic low level. When the first selection signal is deactivated, the glitch free multiplexer may stop outputting the auxiliary clock signal at a time when the auxiliary clock signal is at the logic low level and output the mux clock signal as the glitch free clock signal at a time when the mux clock signal is at the logic low level.

The glitch free multiplexer may include a first synchronizer configured to generate a mux clock enable signal by delaying an inverted version of the first selection signal in synchronization with the mux clock signal, a second synchronizer configured to generate an auxiliary clock enable signal by delaying the first selection signal in synchronization with the auxiliary clock signal, and an output control circuit configured to output the auxiliary clock signal as the glitch free clock signal when the switch control signal is activated, and to output one of the auxiliary clock signal and the mux clock signal as the glitch free clock signal based on a logic level of the auxiliary clock enable signal and a logic level of the mux clock enable signal when the switch control signal is deactivated.

When the switch control signal is deactivated, the output control circuit may output the auxiliary clock signal as the glitch free clock signal while the auxiliary clock enable signal is activated, and output the mux clock signal as the glitch free clock signal when the mux clock enable signal is activated.

The first synchronizer may include an inverter configured to invert the first selection signal, an AND gate configured to perform an AND operation on an output signal of the inverter and an inverted auxiliary clock enable signal, which corresponds to an inverted version of the auxiliary clock enable signal, a first flip-flop configured to latch an output signal of the AND gate in synchronization with a rising edge of the mux clock signal, and to output the latched signal, and a second flip-flop configured to latch an output signal of the first flip-flop in synchronization with a falling edge of the mux clock signal, to output the latched signal as the mux clock enable signal, and to output an inverted version of the mux clock enable signal as an inverted mux clock enable signal.

The second synchronizer may include an AND gate configured to perform an AND operation on the first selection signal and an inverted mux clock enable signal, which corresponds to an inverted version of the mux clock enable signal, a first flip-flop configured to latch an output signal of the AND gate in synchronization with a rising edge of the auxiliary clock signal, and to output the latched signal, and a second flip-flop configured to latch an output signal of the first flip-flop in synchronization with a falling edge of the auxiliary clock signal, to output the latched signal as the auxiliary clock enable signal, and to output an inverted version of the auxiliary clock enable signal as an inverted auxiliary clock enable signal.

The output control circuit may include an inverter configured to invert the switch control signal, a first AND gate configured to perform an AND operation on an output signal of the inverter and the mux clock enable signal, a second AND gate configured to perform an AND operation on an output signal of the first AND gate and the mux clock signal, a first OR gate configured to perform an OR operation on the auxiliary clock enable signal and the switch control signal, a third AND gate configured to perform an AND operation on an output signal of the first OR gate and the auxiliary clock signal, and a second OR gate configured to perform an OR operation on an output signal of the second AND gate and an output signal of the third AND gate to generate the glitch free clock signal.

The glitch free multiplexer further may further include a feedback circuit configured to latch the output signal of the first OR gate in synchronization with the auxiliary clock signal, and to provide the latched signal to the controller as a trigger signal.

The controller may activate the first selection signal in synchronization with the auxiliary clock signal when the logic level of the mode signal is changed, change the logic level of the second selection signal when a logic level of the trigger signal is changed while the first selection signal is activated, and deactivate the first selection signal after a delay time from a time at which the logic level of the second selection signal is changed.

When the logic level of the trigger signal is changed while the first selection signal is activated, the controller may perform a count operation in synchronization with the auxiliary clock signal to generate a count value, and deactivate the first selection signal when the count value reaches a threshold value.

The switching circuit may include a normal multiplexer configured to output one of the first clock signal and the second clock signal as a mux clock signal based on the logic level of the second selection signal, and a glitch free multiplexer configured to output the mux clock signal as the glitch free clock signal while the first selection signal is maintained at a deactivated state, to stop outputting the mux clock signal, to output the auxiliary clock signal as the glitch free clock signal based on the switch control signal, and to change a logic level of a trigger signal when the first selection signal is activated, and to stop outputting the auxiliary clock signal and to output the mux clock signal as the glitch free clock signal when the first selection signal is deactivated. The controller may activate the first selection signal in synchronization with the auxiliary clock signal when the logic level of the mode signal is changed, change the logic level of the second selection signal when the logic level of the trigger signal is changed while the first selection signal is activated, and deactivate the first selection signal after a delay time from a time at which the logic level of the second selection signal is changed.

According to another example embodiment, there is provided a system-on-chip which may include a first clock signal generator, a second clock signal generator, a clock switch device, and a processing block. The first clock signal generator may generate a first clock signal and a second clock signal. A frequency of the second clock signal may be different from a frequency of the first clock signal. The clock switch device may set a clock switch period when a logic level of a mode signal is changed, output one clock signal between the first clock signal and the second clock signal as a glitch free clock signal before the clock switch period, stop outputting the one clock signal and outputs an auxiliary clock signal as the glitch free clock signal during the clock switch period, and stop outputting the auxiliary clock signal and outputs another clock signal between the first clock signal and the second clock signal as the glitch free clock signal after the clock switch period. The processing block may operate in synchronization with the glitch free clock signal.

One of the first clock signal and the second clock signal may stop toggling when the mode signal is at a first logic level.

According to still another example embodiment, there is provided a computing system which may include a modem and a system-on-chip. The modem may communicate data with an external device. The system-on-chip may communicate the data with the modem in synchronization with one of a first clock signal and a second clock signal based on an operation mode. The system-on-chip may include a first clock signal generator, a second clock signal generator, a clock switch device, and a processing block. The first clock signal generator may generate the first clock signal. The second clock signal generator may generate the second clock signal. A frequency of the second clock signal may be different from a frequency of the first clock signal. The clock switch device may set a clock switch period when a logic level of a mode signal is changed, output one clock signal between the first clock signal and the second clock signal as a glitch free clock signal before the clock switch period, stop outputting the one clock signal and output an auxiliary clock signal as the glitch free clock signal during the clock switch period, and stop outputting the auxiliary clock signal and output another clock signal between the first clock signal and the second clock signal as the glitch free clock signal after the clock switch period. The processing block may operate in synchronization with the glitch free clock signal.

BRIEF DESCRIPTION OF THE DRAWINGS

Illustrative, non-limiting example embodiments will be more clearly understood from the following detailed description in conjunction with the accompanying drawings.

DETAILED DESCRIPTION OF THE EXEMPLARY EMBODIMENTS

Figure 1:
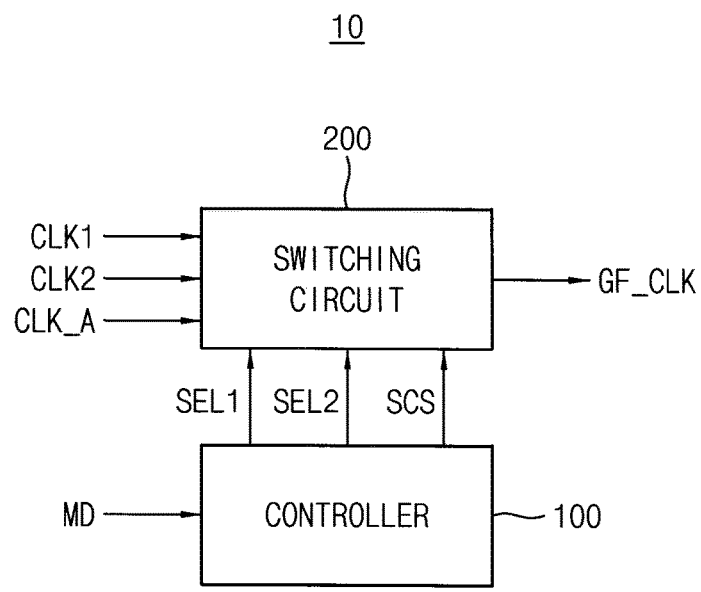
FIG. 1 is a block diagram illustrating a clock switch device, according to an example embodiment.

Various example embodiments will be described more fully with reference to the accompanying drawings, in which some example embodiments are shown. The inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a clock switch device, according to an example embodiment.

A clock switch device 10 illustrated in FIG. 1 outputs one of a first clock signal CLK1 and a second clock signal CLK2 as a glitch free clock signal GF_CLK, which does not include a glitch, based on a logic level of a mode signal MD.

For example, when the logic level of the mode signal MD is at a first logic level, the clock switch device 10 may output the first clock signal CLK1 as the glitch free clock signal GF_CLK. Alternately, when the logic level of the mode signal MD is at a second logic level, the clock switch device 10 may output the second clock signal CLK2 as the glitch free clock signal GF_CLK.

According to an example embodiment, the first logic level may be a logic low level, and the second logic level may be a logic high level. According to another example embodiment, the first logic level may be the logic high level, and the second logic level may be the logic low level. Hereinafter, the first logic level will be described as the logic low level, and the second logic level will be described as the logic high level.

A frequency of the first clock signal CLK1 may be different from a frequency of the second clock signal CLK2.

As will be described later, when the logic level of the mode signal MD is changed, the clock switch device 10 may perform a clock switch operation on the first clock signal CLK1 and the second clock signal CLK2 using an auxiliary clock signal CLK_A to generate the glitch free clock signal GF_CLK that does not include a glitch.

Referring to FIG. 1, the clock switch device 10 includes a controller 100 and a switching circuit 200.

The controller 100 receives the mode signal MD, and controls an operation of the switching circuit 200 using a first selection signal SEL1, a second selection signal SEL2 and a switch control signal SCS. When the logic level of the mode signal MD is changed, the controller 100 sets a clock switch period using the first selection signal SEL1, the second selection signal SEL2 and the switch control signal SCS, and controls a clock switch operation of the switching circuit 200.

The switching circuit 200 receives the first clock signal CLK1, the second clock signal CLK2 and the auxiliary clock signal CLK_A. The switching circuit 200 performs the clock switch operation on the first clock signal CLK1 and the second clock signal CLK2 based on the first selection signal SEL1, the second selection signal SEL2 and the switch control signal SCS. That is, the switching circuit 200 outputs one clock signal between the first clock signal CLK1 and the second clock signal CLK2 as the glitch free clock signal GF_CLK before the clock switch period. The switching circuit 200 stops outputting the one clock signal and outputs the auxiliary clock signal CLK_A as the glitch free clock signal GF_CLK during the clock switch period. The switching circuit 200 stops outputting the auxiliary clock signal CLK_A and outputs another clock signal between the first clock signal CLK1 and the second clock signal CLK2 as the glitch free clock signal GF_CLK after the clock switch period.

For example, when the mode signal MD transitions from the first logic level to the second logic level, the switching circuit 200 outputs the first clock signal CLK1 as the glitch free clock signal GF_CLK before the clock switch period, switches the glitch free clock signal GF_CLK from the first clock signal CLK1 to the auxiliary clock signal CLK_A without incurring a glitch to output the auxiliary clock signal CLK_A as the glitch free clock signal GF_CLK during the clock switch period, and switches the glitch free clock signal GF_CLK from the auxiliary clock signal CLK_A to the second clock signal CLK2 without incurring a glitch to output the second clock signal CLK2 as the glitch free clock signal GF_CLK after the clock switch period.

Similarly, when the mode signal MD transitions from the second logic level to the first logic level, the switching circuit 200 outputs the second clock signal CLK2 as the glitch free clock signal GF_CLK before the clock switch period, switches the glitch free clock signal GF_CLK from the second clock signal CLK2 to the auxiliary clock signal CLK_A without incurring a glitch to output the auxiliary clock signal CLK_A as the glitch free clock signal GF_CLK during the clock switch period, and switches the glitch free clock signal GF_CLK from the auxiliary clock signal CLK_A to the first clock signal CLK1 without incurring a glitch to output the first clock signal CLK1 as the glitch free clock signal GF_CLK after the clock switch period.

According to an example embodiment, one of the first clock signal CLK1 and the second clock signal CLK2 may stop toggling when the mode signal MD is at the first logic level.

For example, in the case that the clock switch device 10 outputs the first clock signal CLK1 as the glitch free clock signal GF_CLK when the mode signal MD is at the first logic level, and outputs the second clock signal CLK2 as the glitch free clock signal GF_CLK when the mode signal MD is at the second logic level, the first clock signal CLK1 may toggle regardless of the logic level of the mode signal MD, and the second clock signal CLK2 may stop toggling while the mode signal MD is at the first logic level.

Hereinafter, it will be described that the clock switch device 10 outputs the first clock signal CLK1 as the glitch free clock signal GF_CLK when the mode signal MD is at the first logic level, and outputs the second clock signal CLK2 as the glitch free clock signal GF_CLK when the mode signal MD is at the second logic level. In addition, it will be described that the first clock signal CLK1 toggles regardless of the logic level of the mode signal MD, and the second clock signal CLK2 stops toggling while the mode signal MD is at the first logic level.

According to an example embodiment, the clock switch device 10 may be used in a high speed serial interface (HSSI).

Figure 2:
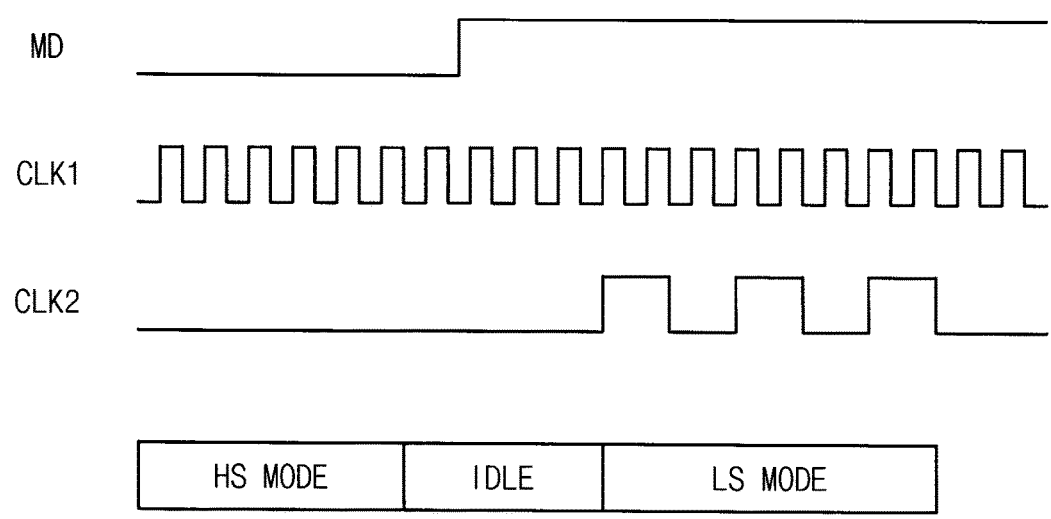
FIGS. 2 and 3 are diagrams for describing a first clock signal and a second clock signal provided to the clock switch device of FIG. 1 when the clock switch device of FIG. 1 is used in a high speed serial interface (HSSI), according to an example embodiment.
Figure 3:
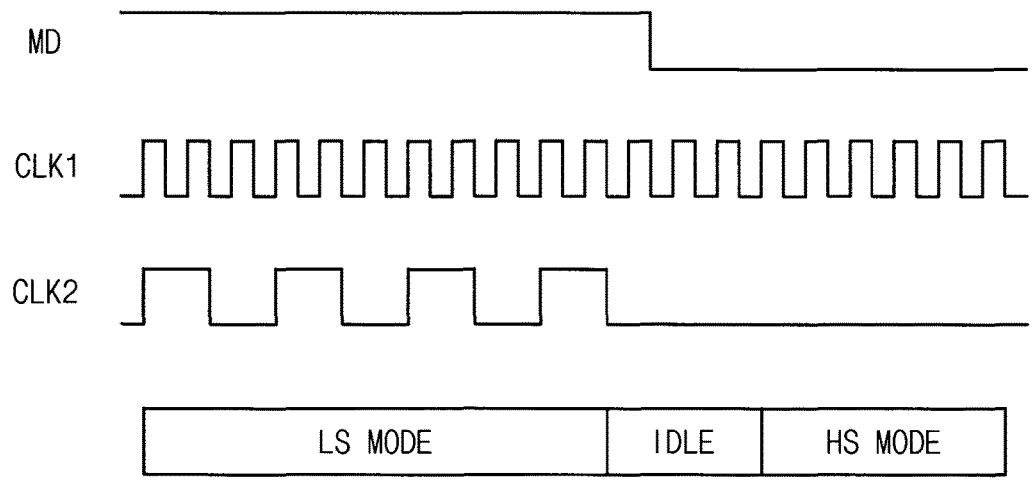

FIGS. 2 and 3 are diagrams for describing a first clock signal and a second clock signal provided to the clock switch device of FIG. 1 when the clock switch device of FIG. 1 is used in a high speed serial interface (HSSI).

According to the HSSI, data are transferred based on a high speed clock signal, which is generated by a phase locked loop (PLL), in a high speed mode, and are transferred based on a low speed clock signal, which is generated using the transferred data, in a low speed mode.

The high speed clock signal may be provided to the clock switch device 10 as the first clock signal CLK1, and the low speed clock signal may be provided to the clock switch device 10 as the second clock signal CLK2.

As illustrated in FIG. 2, when an operation mode of the HSSI is changed from the high speed mode to the low speed mode, the mode signal MD may transition from the first logic level to the second logic level during an idle period IDLE that is between a high speed mode period HS MODE and a low speed mode period LS MODE. In this case, the first clock signal CLK1 may keep toggling regardless of the logic level of the mode signal MD since the first clock signal CLK1 is generated by the PLL. However, since the second clock signal CLK2 is generated using the transferred data, the second clock signal CLK2 may stop toggling while the mode signal MD is at the first logic level, and toggle when the data is transferred during the low speed mode period LS MODE.

As illustrated in FIG. 3, when the operation mode of the HSSI is changed from the low speed mode to the high speed mode, the mode signal MD may transition from the second logic level to the first logic level during an idle period IDLE that is between the low speed mode period LS MODE and the high speed mode period HS MODE. In this case, the first clock signal CLK1 may keep toggling regardless of the logic level of the mode signal MD since the first clock signal CLK1 is generated by the PLL. However, since the second clock signal CLK2 is generated using the transferred data, the second clock signal CLK2 may toggle when the data is transferred during the low speed mode period LS MODE and stop toggling while the mode signal MD is at the first logic level.

Although FIGS. 2 and 3 illustrate the first clock signal CLK1 and the second clock signal CLK2 when the clock switch device 10 is used in the HSSI, example embodiments are not limited thereto. The clock switch device 10 according to the above example embodiments may be used in any system-on-chip that has a high speed mode and a low speed mode.

Figure 4:
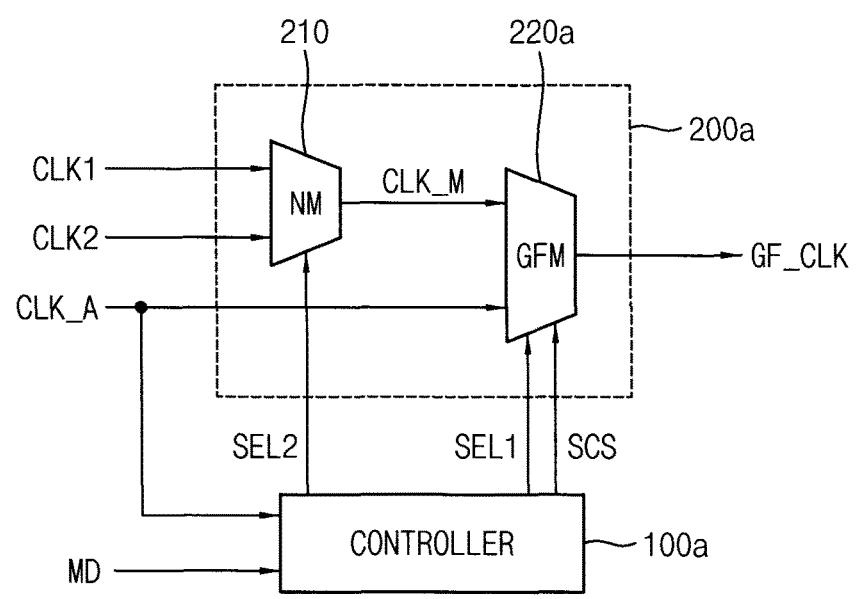
FIG. 4 is a block diagram illustrating an example of the clock switch device of FIG. 1.

FIG. 4 is a block diagram illustrating an example of the clock switch device of FIG. 1.

Referring to FIG. 4, a clock switch device 10a may include a controller 100a and a switching circuit 200a.

The controller 100a may activate the first selection signal SEL1 during the clock switch period when the logic level of the mode signal MD is changed. Therefore, the clock switch period may be defined as a period during which the first selection signal SEL1 is activated.

According to an example embodiment, duration of the clock switch period may be predetermined.

In addition, the controller 100a may generate the switch control signal SCS based on the logic level of the mode signal MD when the logic level of the mode signal MD is changed.

According to an example embodiment, the controller 100a may store information that the first clock signal CLK1 toggles regardless of the logic level of the mode signal MD, and the second clock signal CLK2 stops toggling based on the logic level of the mode signal MD. In this case, the controller 100a may maintain the switch control signal SCS in a deactivated state when the mode signal MD transitions from the first logic level to the second logic level, and activate the switch control signal SCS together with the first selection signal SEL1 during the clock switch period when the mode signal MD transitions from the second logic level to the first logic level.

According to another example embodiment, the controller 100a may not store information whether each of the first clock signal CLK1 and the second clock signal CLK2 toggles regardless of the logic level of the mode signal MD or stops toggling based on the logic level of the mode signal MD. In this case, the controller 100a may determine whether the first clock signal CLK1 keeps toggling after the mode signal MD transitions from the first logic level to the second logic level. When the first clock signal CLK1 keeps toggling after the mode signal MD transitions from the first logic level to the second logic level, the controller 100a may maintain the switch control signal SCS in the deactivated state. When the first clock signal CLK1 stops toggling after the mode signal MD transitions from the first logic level to the second logic level, the controller 100a may activate the switch control signal SCS together with the first selection signal SEL1 during the clock switch period. Similarly, the controller 100a may determine whether the second clock signal CLK2 keeps toggling after the mode signal MD transitions from the second logic level to the first logic level. When the second clock signal CLK2 keeps toggling after the mode signal MD transitions from the second logic level to the first logic level, the controller 100a may maintain the switch control signal SCS in the deactivated state. When the second clock signal CLK2 stops toggling after the mode signal MD transitions from the second logic level to the first logic level, the controller 100a may activate the switch control signal SCS together with the first selection signal SEL1 during the clock switch period.

Therefore, the controller 100a may maintain the switch control signal SCS in the deactivated state when the glitch free clock signal GF_CLK is switched from the first clock signal CLK1, which toggles regardless of the logic level of the mode signal MD, to the second clock signal CLK2, which stops toggling based on the logic level of the mode signal MD.

On the other hand, the controller 100a may activate the switch control signal SCS together with the first selection signal SEL1 during the clock switch period when the glitch free clock signal GF_CLK is switched from the second clock signal CLK2, which stops toggling based on the logic level of the mode signal MD, to the first clock signal CLK1, which toggles regardless of the logic level of the mode signal MD. In this case, both the first selection signal SEL1 and the switch control signal SCS may be activated during the clock switch period.

The controller 100a may change a logic level of the second selection signal SEL2 during the clock switch period. That is, the controller 100a may change the logic level of the second selection signal SEL2 while the first selection signal SEL1 is activated.

For example, when the mode signal MD transitions from the first logic level to the second logic level, the controller 100a may change the logic level of the second selection signal SEL2 from the first logic level to the second logic level while the first selection signal SEL1 is at an activated state. When the mode signal MD transitions from the second logic level to the first logic level, the controller 100a may change the logic level of the second selection signal SEL2 from the second logic level to the first logic level while the first selection signal SEL1 is at an activated state.

According to an example embodiment, the controller 100a may generate the first selection signal SEL1, the second selection signal SEL2 and the switch control signal SCS in synchronization with the auxiliary clock signal CLK_A. That is, the first selection signal SEL1, the second selection signal SEL2 and the switch control signal SCS may transition in synchronization with the auxiliary clock signal CLK_A.

The switching circuit 200a may include a normal multiplexer NM 210 and a glitch free multiplexer GFM 220a.

The normal multiplexer 210 may output one of the first clock signal CLK1 and the second clock signal CLK2 as a mux clock signal CLK_M based on the logic level of the second selection signal SEL2.

The glitch free multiplexer 220a may output the mux clock signal CLK_M as the glitch free clock signal GF_CLK while the first selection signal SEL1 is maintained at a deactivated state. When the first selection signal SEL1 is activated, the glitch free multiplexer 220a may stop outputting the mux clock signal CLK_M and output the auxiliary clock signal CLK_A as the glitch free clock signal GF_CLK based on the switch control signal SCS. When the first selection signal SEL1 is deactivated, the glitch free multiplexer 220a may stop outputting the auxiliary clock signal CLK_A and output the mux clock signal CLK_M as the glitch free clock signal GF_CLK.

For example, the glitch free multiplexer 220a may output the mux clock signal CLK_M as the glitch free clock signal GF_CLK while the first selection signal SEL1 is maintained at a deactivated state. When the first selection signal SEL1 is activated, the glitch free multiplexer 220a may, based on the switch control signal SCS, stop outputting the mux clock signal CLK_M at a time when the mux clock signal CLK_M is at the logic low level and output the auxiliary clock signal CLK_A as the glitch free clock signal GF_CLK at a time when the auxiliary clock signal CLK_A is at the logic low level. When the first selection signal SEL1 is deactivated, the glitch free multiplexer 200a may stop outputting the auxiliary clock signal CLK_A at a time when the auxiliary clock signal CLK_A is at the logic low level and output the mux clock signal CLK_M as the glitch free clock signal GF_CLK at a time when the mux clock signal CLK_M is at the logic low level.

Figure 5:
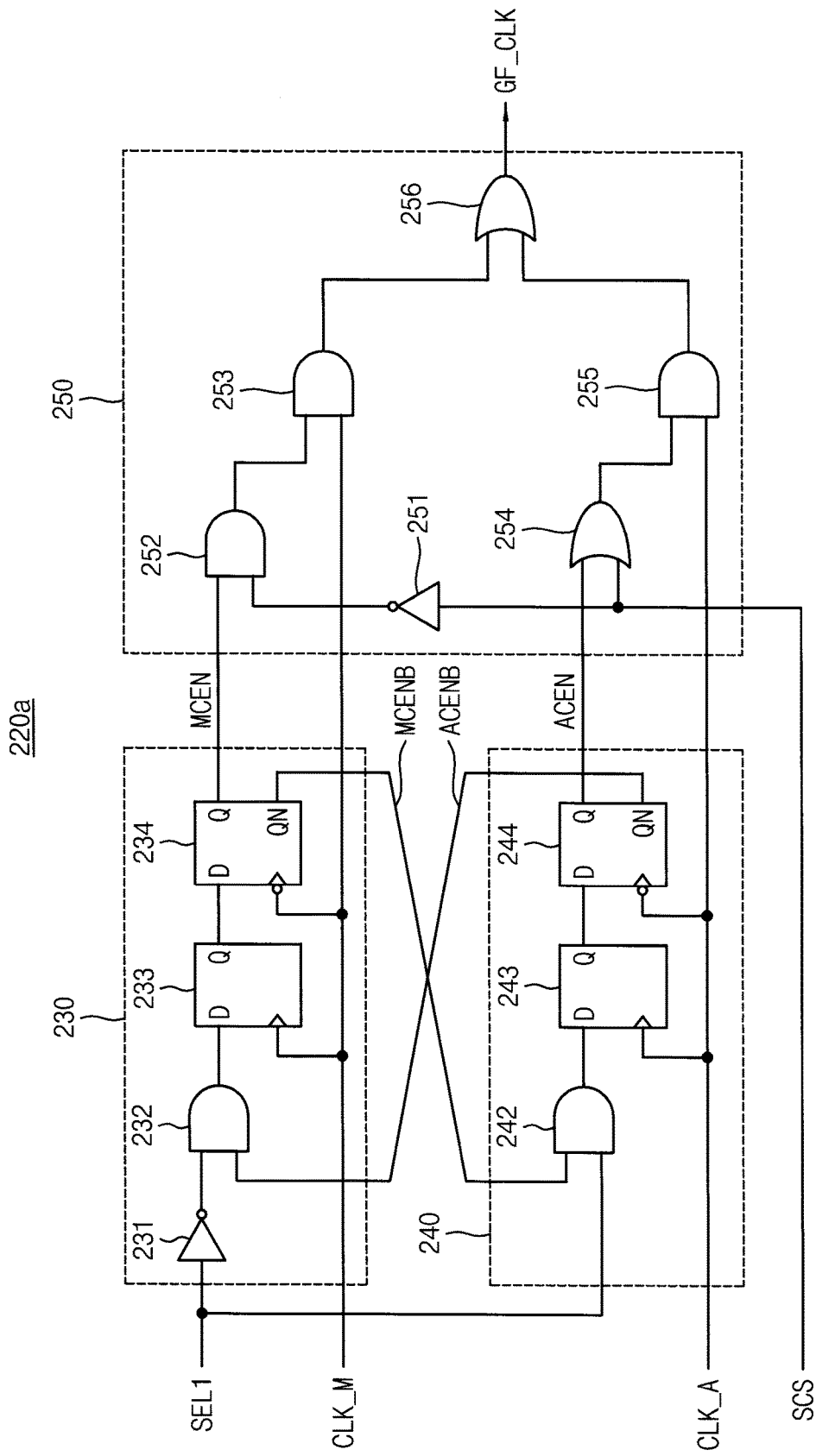
FIG. 5 is a circuit diagram illustrating an example of a glitch free multiplexer included in the clock switch device of FIG. 4.

FIG. 5 is a circuit diagram illustrating an example of a glitch free multiplexer included in the clock switch device of FIG. 4, according to an exemplary embodiment.

Referring to FIG. 5, the glitch free multiplexer 220a may include a first synchronizer 230, a second synchronizer 240 and an output control circuit 250.

The first synchronizer 230 may generate a mux clock enable signal MCEN by delaying an inverted version of the first selection signal SEL1 in synchronization with the mux clock signal CLK_M.

The second synchronizer 240 may generate an auxiliary clock enable signal ACEN by delaying the first selection signal SEL1 in synchronization with the auxiliary clock signal CLK_A.

When the switch control signal SCS is activated, the output control circuit 250 may output the auxiliary clock signal CLK_A as the glitch free clock signal GF_CLK.

When the switch control signal SCS is deactivated, the output control circuit 250 may output one of the auxiliary clock signal CLK_A and the mux clock signal CLK_M as the glitch free clock signal GF_CLK based on a logic level of the auxiliary clock enable signal ACEN and a logic level of the mux clock enable signal MCEN. For example, when the switch control signal SCS is deactivated, the output control circuit 250 may output the auxiliary clock signal CLK_A as the glitch free clock signal GF_CLK while the auxiliary clock enable signal ACEN is activated, and output the mux clock signal CLK_M as the glitch free clock signal GF_CLK while the mux clock enable signal MCEN is activated.

The first synchronizer 230 may include a first inverter 231, a first AND gate 232, a first flip-flop 233 and a second flip-flop 234.

The first inverter 231 may invert the first selection signal SEL1.

The first AND gate 232 may perform an AND operation on an output signal of the first inverter 231 and an inverted auxiliary clock enable signal ACENB, which corresponds to an inverted version of the auxiliary clock enable signal ACEN.

The first flip-flop 233 may latch an output signal of the first AND gate 232 in synchronization with a rising edge of the mux clock signal CLK_M, and output the latched signal.

The second flip-flop 234 may latch an output signal of the first flip-flop 233 in synchronization with a falling edge of the mux clock signal CLK_M, output the latched signal as the mux clock enable signal MCEN, and output an inverted version of the mux clock enable signal MCEN as an inverted mux clock enable signal MCENB.

The second synchronizer 240 may include a second AND gate 242, a third flip-flop 243 and a fourth flip-flop 244.

The second AND gate 242 may perform an AND operation on the first selection signal SEL1 and the inverted mux clock enable signal MCENB, which corresponds to the inverted version of the mux clock enable signal MCEN.

The third flip-flop 243 may latch an output signal of the second AND gate 242 in synchronization with a rising edge of the auxiliary clock signal CLK_A, and output the latched signal.

The fourth flip-flop 244 may latch an output signal of the third flip-flop 243 in synchronization with a falling edge of the auxiliary clock signal CLK_A, output the latched signal as the auxiliary clock enable signal ACEN, and output the inverted version of the auxiliary clock enable signal ACEN as the inverted auxiliary clock enable signal ACENB.

The output control circuit 250 may include a second inverter 251, a third AND gate 252, a fourth AND gate 253, a first OR gate 254, a fifth AND gate 255 and a second OR gate 256.

The second inverter 251 may invert the switch control signal SCS.

The third AND gate 252 may perform an AND operation on an output signal of the second inverter 251 and the mux clock enable signal MCEN.

The fourth AND gate 253 may perform an AND operation on an output signal of the third AND gate 252 and the mux clock signal CLK_M.

The first OR gate 254 may perform an OR operation on the auxiliary clock enable signal ACEN and the switch control signal SCS.

The fifth AND gate 255 may perform an AND operation on an output signal of the first OR gate 254 and the auxiliary clock signal CLK_A.

The second OR gate 256 may perform an OR operation on an output signal of the fourth AND gate 253 and an output signal of the fifth AND gate 255 to generate the glitch free clock signal GF_CLK.

Figure 6:
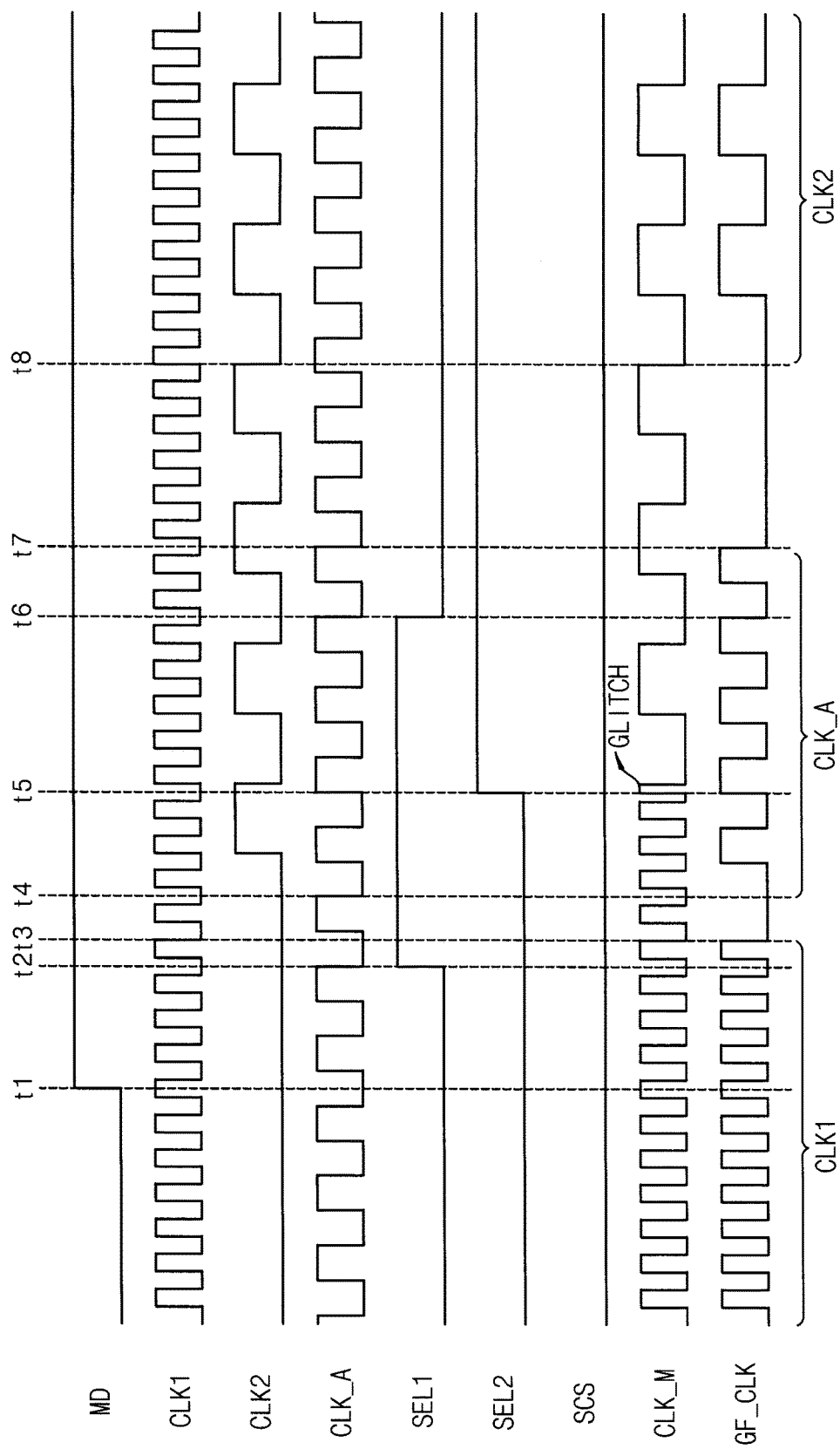
FIGS. 6 and 7 are diagrams for describing an operation of the clock switch device of FIG. 4, according to example embodiments.
Figure 7:
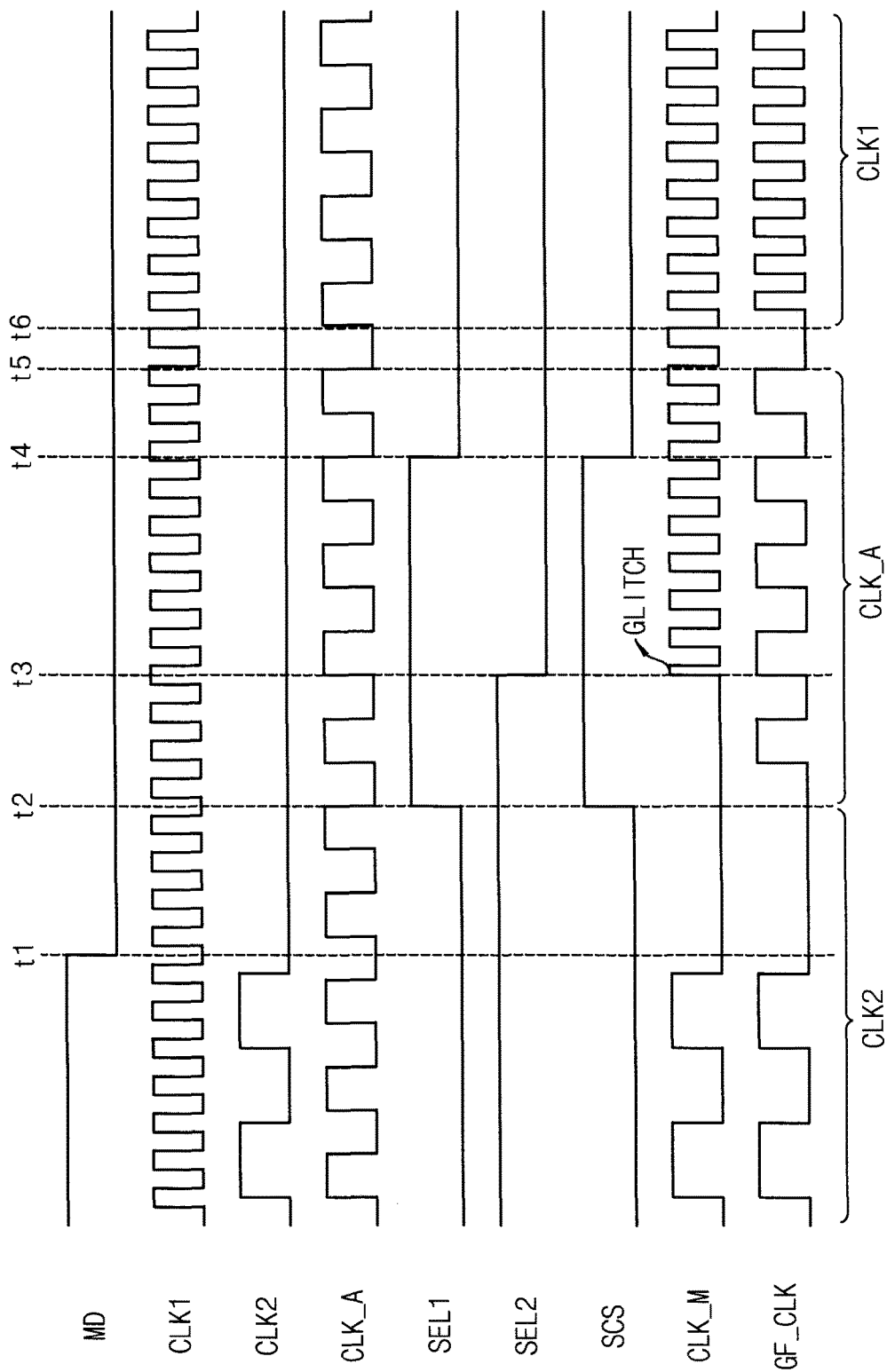

FIGS. 6 and 7 are diagrams for describing an operation of the clock switch device of FIG. 4.

Hereinafter, an operation of the clock switch device 10a of FIG. 4 will be described with reference to FIGS. 4 to 7.

FIG. 6 represents an operation of the clock switch device 10a of FIG. 4 to switch the glitch free clock signal GF_CLK from the first clock signal CLK1 to the second clock signal CLK2 when the mode signal MD transitions from the logic low level to the logic high level.

Referring to FIG. 6, while the mode signal MD is maintained at the logic low level before a first time t1, the controller 100a may deactivate the first selection signal SEL1 to the logic low level, maintain the second selection signal SEL2 at the logic low level, and maintain the switch control signal SCS at the logic low level.

Therefore, the normal multiplexer 210 may output the first selection signal SEL1 as the mux clock signal CLK_M in response to the second selection signal SEL2 having the logic low level.

Since the first selection signal SEL1 is maintained at the logic low level before the first time t1, the mux clock enable signal MCEN output from the second flip-flop 234 may be maintained at the logic high level, and the auxiliary clock enable signal ACEN output from the fourth flip-flop 244 may be maintained at the logic low level.

Since the switch control signal SCS is maintained at the logic low level before the first time t1, the second OR gate 256 may output the mux clock signal CLK_M, which corresponds to the first clock signal CLK1, as the glitch free clock signal GF_CLK.

When the mode signal MD transitions from the logic low level to the logic high level at the first time t1, the controller 100a may activate the first selection signal SEL1 to the logic high level at a second time t2 in synchronization with the auxiliary clock signal CLK_A. In addition, since the first clock signal CLK1 keeps toggling after the mode signal MD transitions from the logic low level to the logic high level at the first time t1, the controller 100a may maintain the switch control signal SCS in the logic low level.

Since the first selection signal SEL1 is activated to the logic high level at the second time t2, the output signal of the first flip-flop 233 may transition to the logic low level at a first rising edge of the mux clock signal CLK_M that comes after the second time t2, and the mux clock enable signal MCEN, which corresponds to the output signal of the second flip-flop 234, may transition to the logic low level at a third time t3, which corresponds to a next falling edge of the mux clock signal CLK_M.

Therefore, the fourth AND gate 253 included in the output control circuit 250 may stop outputting the mux clock signal CLK_M from the third time t3. As such, the glitch free clock signal GF_CLK output from the second OR gate 256 may be maintained at the logic level from the third time t3.

Since the inverted mux clock enable signal MCENB transitions to the logic high level at the third time t3, the output signal of the third flip-flop 243 may transition to the logic high level at a first rising edge of the auxiliary clock signal CLK_A that comes after the third time t3, and the auxiliary clock enable signal ACEN, which corresponds to the output signal of the fourth flip-flop 244, may transition to the logic high level at a fourth time t4, which corresponds to a next falling edge of the auxiliary clock signal CLK_A.

Therefore, the fifth AND gate 255 included in the output control circuit 250 may output the auxiliary clock signal CLK_A from the fourth time t4. As such, the second OR gate 256 may output the auxiliary clock signal CLK_A as the glitch free clock signal GF_CLK from the fourth time t4.

At a fifth time t5, which is after a predetermined time from the second time t2 at which the controller 100a activates the first selection signal SEL1, the controller 100a may transition the second selection signal SEL2 to the logic high level in synchronization with the auxiliary clock signal CLK_A. Therefore, the normal multiplexer 210 may output the second selection signal SEL2 as the mux clock signal CLK_M in response to the second selection signal SEL2 having the logic high level.

As illustrated in FIG. 6, a glitch may occur in the mux clock signal CLK_M at the fifth time t5. However, as described above, the second OR gate 256 included in the output control circuit 250 may output the auxiliary clock signal CLK_A as the glitch free clock signal GF_CLK from the fourth time t4. Therefore, although the glitch occurs in the mux clock signal CLK_M at the fifth time t5, the glitch may not be included in the glitch free clock signal GF_CLK.

At a sixth time t6, which is after a delay time from the fifth time t5 at which the controller 100a transitions the second selection signal SEL2 to the logic high level, the controller 100a may deactivate the first selection signal SEL1 to the logic low level in synchronization with the auxiliary clock signal CLK_A. For example, the controller 100a may perform a count operation in synchronization with the auxiliary clock signal CLK_A to generate a count value after changing the logic level of the second selection signal SEL2 at the fifth time t5, and deactivate the first selection signal SEL1 to the logic low level when the count value reaches a threshold value. The threshold value may be predetermined.

Since the first selection signal SEL1 is deactivated to the logic low level at the sixth time t6, the output signal of the third flip-flop 243 may transition to the logic low level at a first rising edge of the auxiliary clock signal CLK_A that comes after the sixth time t6, and the auxiliary clock enable signal ACEN, which corresponds to the output signal of the fourth flip-flop 244, may transition to the logic low level at a seventh time t7, which corresponds to a next falling edge of the auxiliary clock signal CLK_A.

Therefore, the fifth AND gate 255 included in the output control circuit 250 may stop outputting the auxiliary clock signal CLK_A from the seventh time t7. As such, the glitch free clock signal GF_CLK output from the second OR gate 256 may be maintained at the logic level from the seventh time t7.

Since the inverted auxiliary clock enable signal ACENB transitions to the logic high level at the seventh time t7, the output signal of the first flip-flop 233 may transition to the logic high level at a first rising edge of the mux clock signal CLK_M that comes after the seventh time t7, and the mux clock enable signal MCEN, which corresponds to the output signal of the second flip-flop 234, may transition to the logic high level at an eighth time t8, which corresponds to a next falling edge of the mux clock signal CLK_M.

Therefore, the fourth AND gate 253 included in the output control circuit 250 may output the mux clock signal CLK_M from the eighth time t8. As such, the second OR gate 256 may output the mux clock signal CLK_M, which corresponds to the second clock signal CLK2, as the glitch free clock signal GF_CLK from the eighth time t8.

As described above with reference to FIG. 6, when the mode signal MD transitions from the logic low level to the logic high level, the clock switch device 10a may output the first clock signal CLK1 as the glitch free clock signal GF_CLK until the third time t3, output the auxiliary clock signal CLK_A as the glitch free clock signal GF_CLK from the fourth time t4 to the seventh time t7, and output the second clock signal CLK2 as the glitch free clock signal GF_CLK after the eighth time t8.

FIG. 7 represents an operation of the clock switch device 10a of FIG. 4 to switch the glitch free clock signal GF_CLK from the second clock signal CLK2 to the first clock signal CLK1 when the mode signal MD transitions from the logic high level to the logic low level.

Referring to FIG. 7, while the mode signal MD is maintained at the logic high level before a first time t1, the controller 100a may deactivate the first selection signal SEL1 to the logic level, maintain the second selection signal SEL2 at the logic high level, and maintain the switch control signal SCS at the logic low level.

Therefore, the normal multiplexer 210 may output the second selection signal SEL2 as the mux clock signal CLK_M in response to the second selection signal SEL2 having the logic high level.

Since the first selection signal SEL1 is maintained at the logic low level before the first time t1, the mux clock enable signal MCEN output from the second flip-flop 234 may be maintained at the logic high level, and the auxiliary clock enable signal ACEN output from the fourth flip-flop 244 may be maintained at the logic low level.

Since the switch control signal SCS is maintained at the logic low level before the first time t1, the second OR gate 256 may output the mux clock signal CLK_M, which corresponds to the second clock signal CLK2, as the glitch free clock signal GF_CLK.

When the mode signal MD transitions from the logic high level to the logic low level at the first time t1, the controller 100a may activate the first selection signal SEL1 to the logic high level at a second time t2 in synchronization with the auxiliary clock signal CLK_A. In addition, since the second clock signal CLK2 stops toggling after the mode signal MD transitions from the logic high level to the logic low level at the first time t1, the controller 100a may transition the switch control signal SCS to the logic high level at the second time t2.

Since the first selection signal SEL1 is activated to the logic high level at the second time t2, the output signal of the first AND gate 232 may transition to the logic low level. However, since the second clock signal CLK2 stops toggling after the mode signal MD transitions from the logic high level to the logic low level at the first time t1, the output signal of the first AND gate 232 may not be transferred to the second flip-flop 234 through the first flip-flop 233. Therefore, the mux clock enable signal MCEN may be maintained at the logic high level without transitioning to the logic low level.

However, since the switch control signal SCS transitions to the logic high level at the second time t2, the output signal of the third AND gate 252 may transition to the logic low level at the second time t2. Therefore, although the mux clock enable signal MCEN is maintained at the logic high level, the fourth AND gate 253 included in the output control circuit 250 may stop outputting the mux clock signal CLK_M from the second time t2.

In addition, since the switch control signal SCS transitions to the logic high level at the second time t2, the output signal of the first OR gate 254 may transition to the logic high level at the second time t2. Therefore, although the auxiliary clock enable signal ACEN is maintained at the logic low level, the fifth AND gate 255 included in the output control circuit 250 may output the auxiliary clock signal CLK_A from the second time t2.

Therefore, the second OR gate 256 may output the auxiliary clock signal CLK_A as the glitch free clock signal GF_CLK from the second time t2.

At a third time t3, which is after a predetermined time from the second time t2 at which the controller 100a activates the first selection signal SEL1, the controller 100a may transition the second selection signal SEL2 to the logic low level in synchronization with the auxiliary clock signal CLK_A. Therefore, the normal multiplexer 210 may output the first selection signal SEL1 as the mux clock signal CLK_M in response to the second selection signal SEL2 having the logic low level.

As illustrated in FIG. 7, a glitch may occur in the mux clock signal CLK_M at the third time t3. However, as described above, the second OR gate 256 included in the output control circuit 250 may output the auxiliary clock signal CLK_A as the glitch free clock signal GF_CLK from the second time t2. Therefore, although the glitch occurs in the mux clock signal CLK_M at the third time t3, the glitch may not be include in the glitch free clock signal GF_CLK.

At a fourth time t4, which is after a delay time from the third time t3 at which the controller 100a transitions the second selection signal SEL2 to the logic low level, the controller 100a may deactivate the first selection signal SEL1 and the switch control signal SCS to the logic low level in synchronization with the auxiliary clock signal CLK_A. For example, the controller 100a may perform a count operation in synchronization with the auxiliary clock signal CLK_A to generate a count value after changing the logic level of the second selection signal SEL2 at the third time t3, and deactivate the first selection signal SEL1 and the switch control signal SCS to the logic low level when the count value reaches a threshold value. The threshold value may be predetermined.

Since the first selection signal SEL1 is deactivated to the logic low level at the fourth time t4, the output signal of the third flip-flop 243 may transition to the logic low level at a first rising edge of the auxiliary clock signal CLK_A that comes after the fourth time t4, and the auxiliary clock enable signal ACEN, which corresponds to the output signal of the fourth flip-flop 244, may transition to the logic low level at a fifth time t5, which corresponds to a next falling edge of the auxiliary clock signal CLK_A.

In addition, since the switch control signal SCS is deactivated to the logic low level at the fourth time t4, the fifth AND gate 255 included in the output control circuit 250 may stop outputting the auxiliary clock signal CLK_A from the fifth time t5. As such, the glitch free clock signal GF_CLK output from the second OR gate 256 may be maintained at the logic level from the fifth time t5.

Since the inverted auxiliary clock enable signal ACENB transitions to the logic high level at the fifth time t5, the output signal of the first flip-flop 233 may transition to the logic high level at a first rising edge of the mux clock signal CLK_M that comes after the fifth time t5, and the mux clock enable signal MCEN, which corresponds to the output signal of the second flip-flop 234, may transition to the logic high level at a sixth time t6, which corresponds to a next falling edge of the mux clock signal CLK_M.

Therefore, the fourth AND gate 253 included in the output control circuit 250 may output the mux clock signal CLK_M from the sixth time t6. As such, the second OR gate 256 may output the mux clock signal CLK_M, which corresponds to the first clock signal CLK1, as the glitch free clock signal GF_CLK from the sixth time t6.

As described above with reference to FIG. 7, when the mode signal MD transitions from the logic high level to the logic low level, the clock switch device 10a may output the second clock signal CLK2 as the glitch free clock signal GF_CLK until the second time t2, output the auxiliary clock signal CLK_A as the glitch free clock signal GF_CLK from the second time t2 to the fifth time t5, and output the first clock signal CLK1 as the glitch free clock signal GF_CLK after the sixth time t6.

The clock switch device 10a may perform the clock switch operation described above with reference to FIGS. 4 to 7 on the first clock signal CLK1 and the second clock signal CLK2 using the auxiliary clock signal CLK_A, such that the clock switch device 10a may generate the glitch free clock signal GF_CLK without a glitch.

In addition, although one of the first clock signal CLK1 and the second clock signal CLK2 stops toggling when the mode signal MD is at the first logic level, the clock switch device 10a may perform the clock switch operation stably to generate the glitch free clock signal GF_CLK without incurring a glitch.

Figure 8:
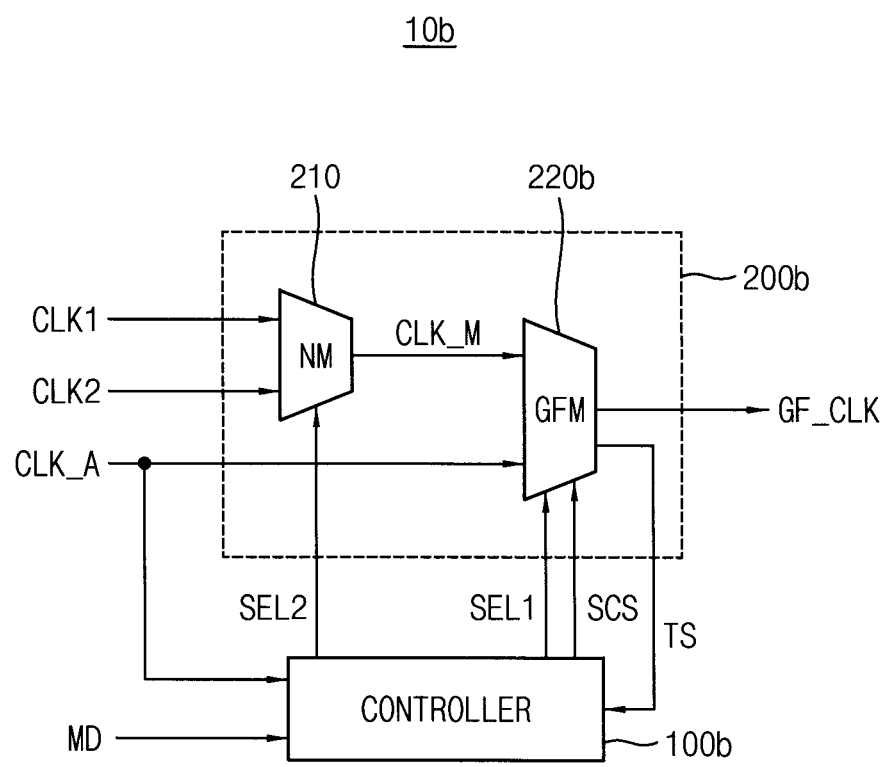
FIG. 8 is a block diagram illustrating an example of the clock switch device of FIG. 1.

FIG. 8 is a block diagram illustrating an example of the clock switch device of FIG. 1.

Referring to FIG. 8, a clock switch device 10b may include a controller 100b and a switching circuit 200b.

The controller 100b may activate the first selection signal SEL1 when the logic level of the mode signal MD is changed.

In addition, the controller 100b may generate the switch control signal SCS based on the logic level of the mode signal MD when the logic level of the mode signal MD is changed.

According to an example embodiment, the controller 100b may store information that the first clock signal CLK1 toggles regardless of the logic level of the mode signal MD and the second clock signal CLK2 stops toggling based on the logic level of the mode signal MD. In this case, the controller 100b may maintain the switch control signal SCS in a deactivated state when the mode signal MD transitions from the first logic level to the second logic level, and activate the switch control signal SCS at the same time as the first selection signal SEL1 when the mode signal MD transitions from the second logic level to the first logic level.

According to another example embodiment, the controller 100b may not store information whether each of the first clock signal CLK1 and the second clock signal CLK2 toggles regardless of the logic level of the mode signal MD or stops toggling based on the logic level of the mode signal MD. In this case, the controller 100b may determine whether the first clock signal CLK1 keeps toggling after the mode signal MD transitions from the first logic level to the second logic level. When the first clock signal CLK1 keeps toggling after the mode signal MD transitions from the first logic level to the second logic level, the controller 100b may maintain the switch control signal SCS in the deactivated state. When the first clock signal CLK1 stops toggling after the mode signal MD transitions from the first logic level to the second logic level, the controller 100b may activate the switch control signal SCS at the same time as the first selection signal SEL1. Similarly, the controller 100b may determine whether the second clock signal CLK2 keeps toggling after the mode signal MD transitions from the second logic level to the first logic level. When the second clock signal CLK2 keeps toggling after the mode signal MD transitions from the second logic level to the first logic level, the controller 100b may maintain the switch control signal SCS in the deactivated state. When the second clock signal CLK2 stops toggling after the mode signal MD transitions from the second logic level to the first logic level, the controller 100b may activate the switch control signal SCS at the same time as the first selection signal SEL1.

Therefore, the controller 100b may maintain the switch control signal SCS in the deactivated state when the glitch free clock signal GF_CLK is switched from the first clock signal CLK1, which toggles regardless of the logic level of the mode signal MD, to the second clock signal CLK2, which stops toggling based on the logic level of the mode signal MD.

On the other hand, the controller 100b may activate the switch control signal SCS at the same time as the first selection signal SEL1 when the glitch free clock signal GF_CLK is switched from the second clock signal CLK2, which stops toggling based on the logic level of the mode signal MD, to the first clock signal CLK1, which toggles regardless of the logic level of the mode signal MD.

While the first selection signal SEL1 is activated, the controller 100b may determine whether a logic level of a trigger signal TS, which is provided by the switching circuit 200b, is changed. When the logic level of the trigger signal TS is changed while the first selection signal SEL1 is activated, the controller 100b may change a logic level of the second selection signal SEL2 in response to the transition of the trigger signal TS.

For example, when the logic level of the trigger signal TS is changed while the first selection signal SEL1 is activated after the mode signal MD transitions from the first logic level to the second logic level, the controller 100b may change the logic level of the second selection signal SEL2 from the first logic level to the second logic level. When the logic level of the trigger signal TS is changed while the first selection signal SEL1 is activated after the mode signal MD transitions from the second logic level to the first logic level, the controller 100b may change the logic level of the second selection signal SEL2 from the second logic level to the first logic level.

In addition, the controller 100b may deactivate the first selection signal SEL1 after a delay time from a time at which the controller 100b changes the logic level of the second selection signal SEL2. For example, the controller 100b may perform a count operation to generate a count value after changing the logic level of the second selection signal SEL2, and deactivate the first selection signal SEL1 when the count value reaches a threshold value. If the switch control signal SCS is in the activated state, the controller 100b may deactivate the switch control signal SCS together with the first selection signal SEL1 when the count value reaches the threshold value. The threshold value may be predetermined.

Therefore, the clock switch period may be defined as a period during which the first selection signal SEL1 is activated.

According to an example embodiment, the controller 100b may generate the first selection signal SEL1, the second selection signal SEL2 and the switch control signal SCS in synchronization with the auxiliary clock signal CLK_A. That is, the first selection signal SEL1, the second selection signal SEL2 and the switch control signal SCS may transition in synchronization with the auxiliary clock signal CLK_A.

The switching circuit 200b may include a normal multiplexer NM 210 and a glitch free multiplexer GFM 220b.

The normal multiplexer 210 may output one of the first clock signal CLK1 and the second clock signal CLK2 as a mux clock signal CLK_M based on the logic level of the second selection signal SEL2.

The glitch free multiplexer 220b may output the mux clock signal CLK_M as the glitch free clock signal GF_CLK while the first selection signal SEL1 is maintained at a deactivated state. When the first selection signal SEL1 is activated, the glitch free multiplexer 220b may stop outputting the mux clock signal CLK_M and output the auxiliary clock signal CLK_A as the glitch free clock signal GF_CLK based on the switch control signal SCS, and then change the logic level of the trigger signal TS. When the first selection signal SEL1 is deactivated, the glitch free multiplexer 220b may stop outputting the auxiliary clock signal CLK_A and output the mux clock signal CLK_M as the glitch free clock signal GF_CLK.

For example, the glitch free multiplexer 220b may output the mux clock signal CLK_M as the glitch free clock signal GF_CLK while the first selection signal SEL1 is maintained at a deactivated state. When the first selection signal SEL1 is activated, the glitch free multiplexer 220b may, based on the switch control signal SCS, stop outputting the mux clock signal CLK_M at a time when the mux clock signal CLK_M is at the logic low level and output the auxiliary clock signal CLK_A as the glitch free clock signal GF_CLK at a time when the auxiliary clock signal CLK_A is at the logic low level. The glitch free multiplexer 220b may change the logic level of the trigger signal TS in response to outputting the auxiliary clock signal CLK_A as the glitch free clock signal GF_CLK. When the first selection signal SEL1 is deactivated, the glitch free multiplexer 200b may stop outputting the auxiliary clock signal CLK_A at a time when the auxiliary clock signal CLK_A is at the logic low level and output the mux clock signal CLK_M as the glitch free clock signal GF_CLK at a time when the mux clock signal CLK_M is at the logic low level.

Figure 9:
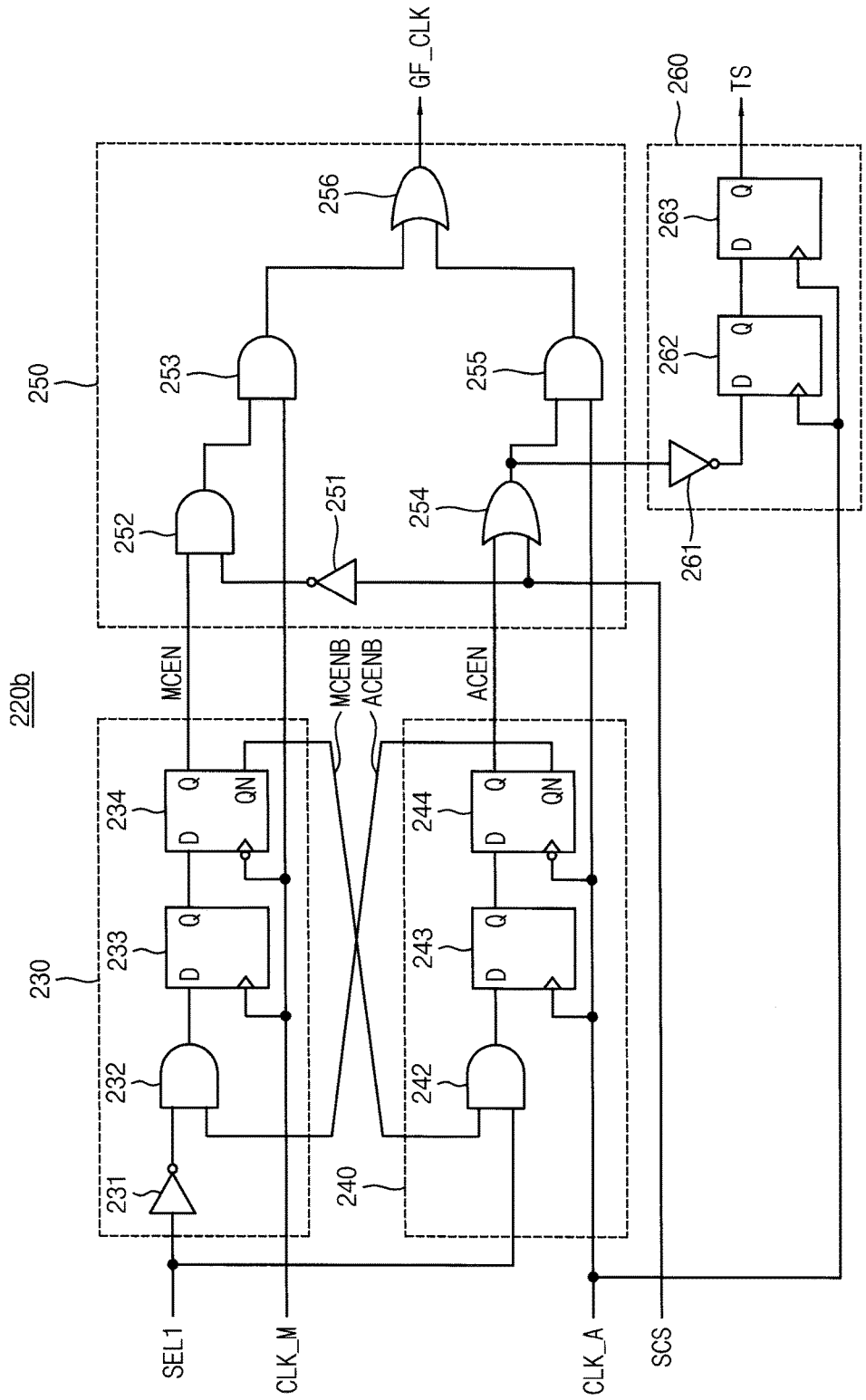
FIG. 9 is a circuit diagram illustrating an example of a glitch free multiplexer included in the clock switch device of FIG. 8.

FIG. 9 is a circuit diagram illustrating an example of a glitch free multiplexer included in the clock switch device of FIG. 8.

Referring to FIG. 9, the glitch free multiplexer 220b may include a first synchronizer 230, a second synchronizer 240, an output control circuit 250 and a feedback circuit 260.

The first synchronizer 230, the second synchronizer 240 and the output control circuit 250 included in the glitch free multiplexer 220b of FIG. 9 may be the same as the first synchronizer 230, the second synchronizer 240 and the output control circuit 250 included in the glitch free multiplexer 220a of FIG. 4, respectively.

The feedback circuit 260 may latch an output signal of the first OR gate 254 included in the output control circuit 250 in synchronization with the auxiliary clock signal CLK_A, and provide the latched signal to the controller 100b as the trigger signal TS.

The feedback circuit 260 may include a third inverter 261, a fifth flip-flop 262 and a sixth flip-flop 263.

The third inverter 261 may invert the output signal of the first OR gate 254.

The fifth flip-flop 262 may latch an output signal of the third inverter 261 in synchronization with a rising edge of the auxiliary clock signal CLK_A, and output the latched signal.

The sixth flip-flop 263 may latch an output signal of the fifth flip-flop 262 in synchronization with a rising edge of the auxiliary clock signal CLK_A, and output the latched signal as the trigger signal TS.

In FIG. 9, the feedback circuit 260 includes two flip-flops connected in series as an example. However, example embodiments are not limited thereto, and the feedback circuit 260 may include at least one flip-flop. In addition, according to example embodiments, the fifth flip-flop 262 and the sixth flip-flop 263 may operate in synchronization with a falling edge of the auxiliary clock signal CLK_A.

Figure 10:
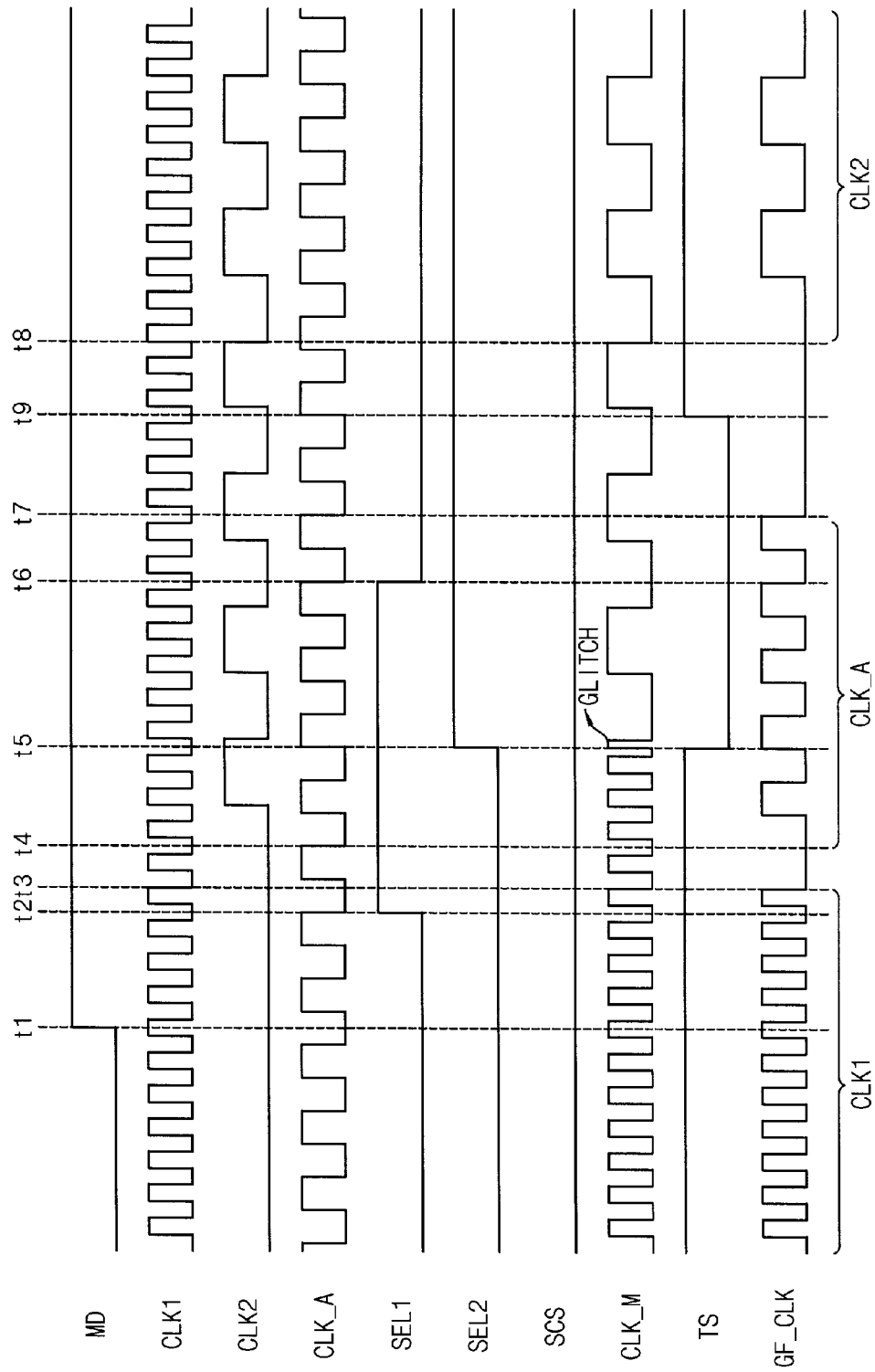
FIGS. 10 and 11 are diagrams for describing an operation of the clock switch device of FIG. 8, according to example embodiments.
Figure 11:
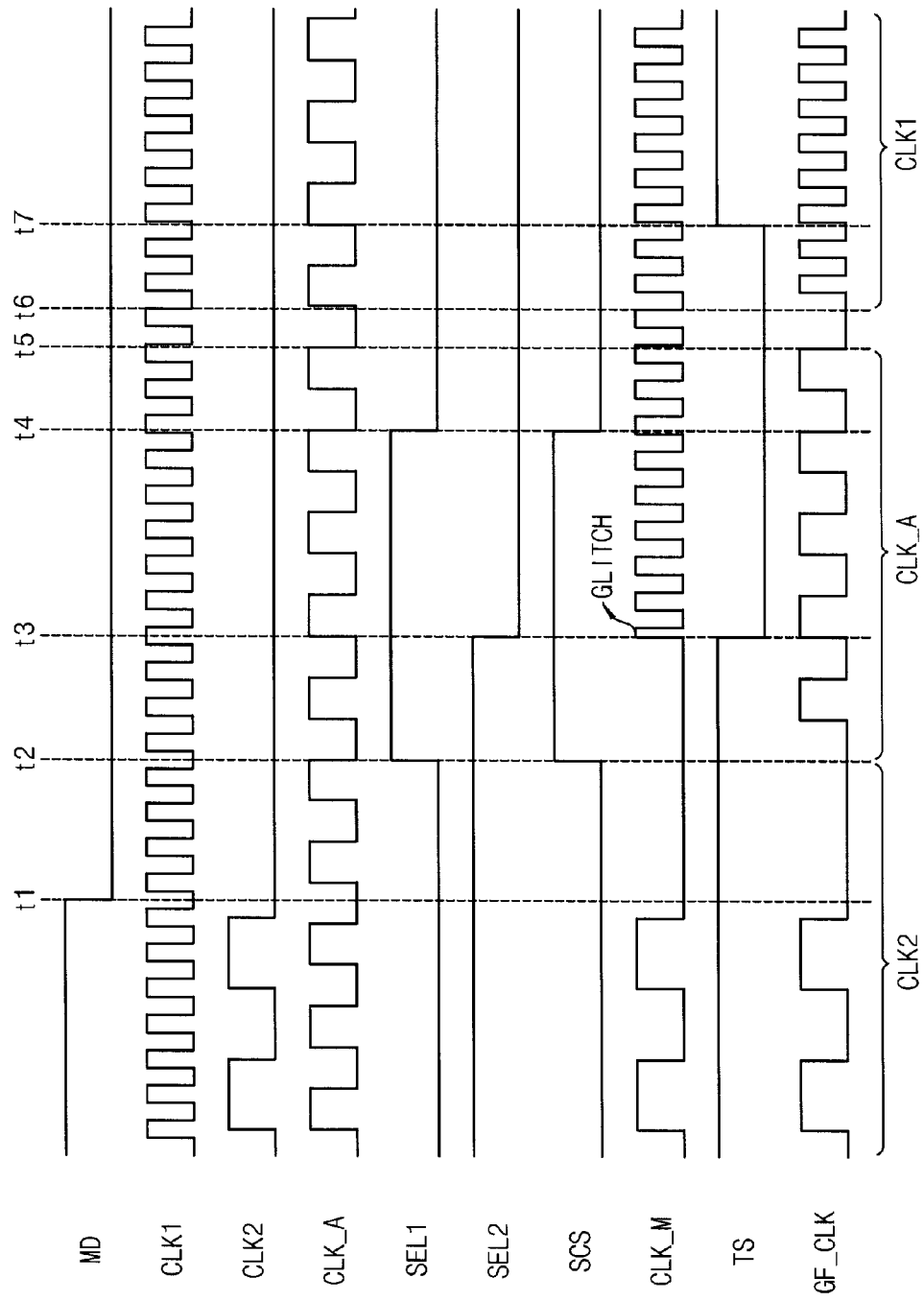

FIGS. 10 and 11 are diagrams for describing an operation of the clock switch device of FIG. 8, according to example embodiments.

FIG. 10 represents an operation of the clock switch device 10b of FIG. 8 to switch the glitch free clock signal GF_CLK from the first clock signal CLK1 to the second clock signal CLK2 when the mode signal MD transitions from the logic low level to the logic high level.

FIG. 11 represents an operation of the clock switch device 10b of FIG. 8 to switch the glitch free clock signal GF_CLK from the second clock signal CLK2 to the first clock signal CLK1 when the mode signal MD transitions from the logic high level to the logic low level.

As described above with reference to FIGS. 8 and 9, the clock switch device 10*b* of FIG. 8 is the same as the clock switch device 10*a* of FIG. 4 except that the switching circuit 200*b* included in the clock switch device 10*b* of FIG. 8 further generates the trigger signal TS, and the controller 100*b* included in the clock switch device 10*b* of FIG. 8 changes the logic level of the second selection signal SEL2 based on the trigger signal TS. Therefore, the operation of the clock switch device 10*b* of FIG. 8 in relation with the trigger signal TS will be described below with reference to FIGS. 10 and 11, and duplicated description will be omitted.

Referring to FIG. 10, at the fourth time t4, the auxiliary clock enable signal ACEN may transition from the logic low level to the logic high level while the switch control signal SCS is maintained at the logic low level. Therefore, at the fourth time t4, the output signal of the first OR gate 254 may transition from the logic low level to the logic high level, and the output signal of the third inverter 261 included in the feedback circuit 260 may transition from the logic high level to the logic low level.

Therefore, the output signal of the fifth flip-flop 262 may transition to the logic low level at a first rising edge of the auxiliary clock signal CLK_A that comes after the fourth time t4, and the trigger signal TS, which corresponds to the output signal of the sixth flip-flop 263, may transition to the logic low level at a fifth time t5, which corresponds to a second rising edge of the auxiliary clock signal CLK_A that comes after the fourth time t4.

Since the trigger signal TS transitions to the logic low level at the fifth time t5, the controller 100*b* may transition the second selection signal SEL2 to the logic high level in synchronization with the auxiliary clock signal CLK_A at the fifth time t5.

At the seventh time t7, the auxiliary clock enable signal ACEN may transition from the logic high level to the logic low level. Therefore, the trigger signal TS, which corresponds to the output signal of the sixth flip-flop 263, may transition to the logic high level at a ninth time t9, which corresponds to a second rising edge of the auxiliary clock signal CLK_A that comes after the seventh time t7. As described above, the controller 100*b* may change the logic level of the second selection signal SEL2 when the logic level of the trigger signal TS is changed while the first selection signal SEL1 is activated. Therefore, although the logic level of the trigger signal TS is changed at the ninth time t9, the controller 100*b* may maintain the logic level of the second selection signal SEL2 at the ninth time t9.

Referring to FIG. 11, before the second time t2, the auxiliary clock enable signal ACEN may be maintained at the logic low level, and the switch control signal SCS may be also maintained at the logic low level. Therefore, the output signal of the first OR gate 254 may be maintained at the logic low level.

Since the switch control signal SCS transitions to the logic high level at the second time t2, the output signal of the first OR gate 254 may transition from the logic low level to the logic high level, and the output signal of the third inverter 261 included in the feedback circuit 260 may transition from the logic high level to the logic low level at the second time t2.

Therefore, the output signal of the fifth flip-flop 262 may transition to the logic low level at a first rising edge of the auxiliary clock signal CLK_A that comes after the second time t2, and the trigger signal TS, which corresponds to the output signal of the sixth flip-flop 263, may transition to the logic low level at a third time t3, which corresponds to a second rising edge of the auxiliary clock signal CLK_A that comes after the second time t2.

Since the trigger signal TS transitions to the logic low level at the third time t3, the controller 100*b* may transition the second selection signal SEL2 to the logic low level in synchronization with the auxiliary clock signal CLK_A at the third time t3.

At the fifth time t5, the auxiliary clock enable signal ACEN may transition from the logic high level to the logic low level. Therefore, the trigger signal TS, which corresponds to the output signal of the sixth flip-flop 263, may transition to the logic high level at a seventh time t7, which corresponds to a second rising edge of the auxiliary clock signal CLK_A that comes after the fifth time t5. As described above, the controller 100*b* may change the logic level of the second selection signal SEL2 when the logic level of the trigger signal TS is changed while the first selection signal SEL1 is activated. Therefore, although the logic level of the trigger signal TS is changed at the seventh time t7, the controller 100*b* may maintain the logic level of the second selection signal SEL2 at the seventh time t7.

The clock switch device 10*b* may perform the clock switch operation described above with reference to FIGS. 8 to 11 on the first clock signal CLK1 and the second clock signal CLK2 using the auxiliary clock signal CLK_A, such that the clock switch device 10*b* may generate the glitch free clock signal GF_CLK without a glitch.

In addition, although one of the first clock signal CLK1 and the second clock signal CLK2 stops toggling when the mode signal MD is at the first logic level, the clock switch device 10*b* may perform the clock switch operation stably to generate the glitch free clock signal GF_CLK without incurring a glitch.

Figure 12:
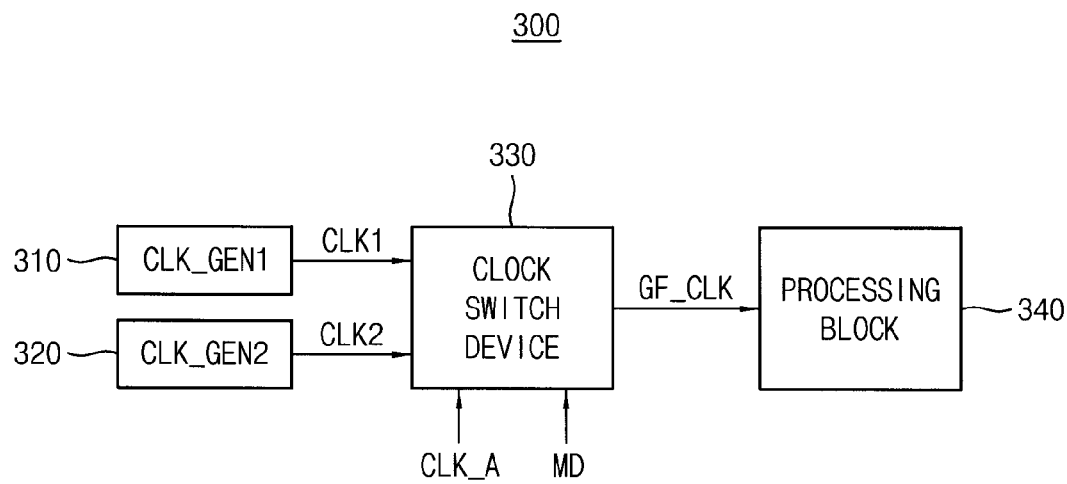
FIG. 12 is a block diagram illustrating a system-on-chip, according to an example embodiments.

FIG. 12 is a block diagram illustrating a system-on-chip, according to an example embodiment.

Referring to FIG. 12, a system-on-chip 300 includes a first clock signal generator CLK_GEN1 310, a second clock signal generator CLK_GEN2 320, a clock switch device 330 and a processing block 340.

The first clock signal generator 310 generates a first clock signal CLK1, and the second clock signal generator 320 generates a second clock signal CLK2. A frequency of the first clock signal CLK1 may be different from a frequency of the second clock signal CLK2.

According to an example embodiment, one of the first clock signal CLK1 and the second clock signal CLK2 may stop toggling when a mode signal MD is at a first logic level.

The clock switch device 330 sets a clock switch period when a logic level of the mode signal MD is changed. The clock switch device 330 outputs one clock signal between the first clock signal CLK1 and the second clock signal CLK2 as a glitch free clock signal GF_CLK before the clock switch period. The clock switch device 330 stops outputting the one clock signal and outputs an auxiliary clock signal CLK_A as the glitch free clock signal GF_CLK during the clock switch period. The clock switch device 330 stops outputting the auxiliary clock signal CLK_A and outputs another clock signal between the first clock signal CLK1 and the second clock signal CLK2 as the glitch free clock signal GF_CLK after the clock switch period.

For example, in the case that the clock switch device 330 outputs the first clock signal CLK1 as the glitch free clock signal GF_CLK when the mode signal MD is at the first logic level, and outputs the second clock signal CLK2 as the glitch free clock signal GF_CLK when the mode signal MD is at the second logic level, the first clock signal CLK1 may toggle regardless of the logic level of the mode signal MD, and the second clock signal CLK2 may stop toggling while the mode signal MD is at the first logic level.

According to an example embodiment, the system-on-chip 300 may receive the auxiliary clock signal CLK_A from outside.

According to another example embodiment, the system-on-chip 300 may generate the auxiliary clock signal CLK_A internally.

The clock switch device 330 included in the system-on-chip 300 of FIG. 12 may be implemented with the clock switch device 10 of FIG. 1.

The processing block 340 operates in synchronization with the glitch free clock signal GF_CLK.

The processing block 340 may perform various computing functions, such as executing specific software for performing specific calculations or tasks, in synchronization with the glitch free clock signal GF_CLK.

For example, the processing block 340 may be a microprocessor, a central process unit (CPU), a digital signal processor, or the like. According to an example embodiment, the processing block 340 may include a single core or multiple cores. For example, the processing block 340 may be a multi-core processor, such as a dual-core processor, a quad-core processor, a hexa-core processor, etc. According to an example embodiment, the processing block 340 may include an internal or external cache memory.

As described above, the clock switch device 330 outputs one of the first clock signal CLK1 and the second clock signal CLK2 as the glitch free clock signal GF_CLK based on the logic level of the mode signal MD. When the logic level of the mode signal MD is changed, the clock switch device 330 performs the clock switch operation on the first clock signal CLK1 and the second clock signal CLK2 using the auxiliary clock signal CLK_A, such that the clock switch device 330 generates the glitch free clock signal GF_CLK without a glitch.

In addition, although one of the first clock signal CLK1 and the second clock signal CLK2 stops toggling when the mode signal MD is at the first logic level, the clock switch device 330 may perform the clock switch operation stably to generate the glitch free clock signal GF_CLK without incurring a glitch.

Since the processing block 340 operates in synchronization with the glitch free clock signal GF_CLK provided by the clock switch device 330, the processing block 340 may effectively switch between a high speed mode and a low speed mode without an operation error.

Figure 13:
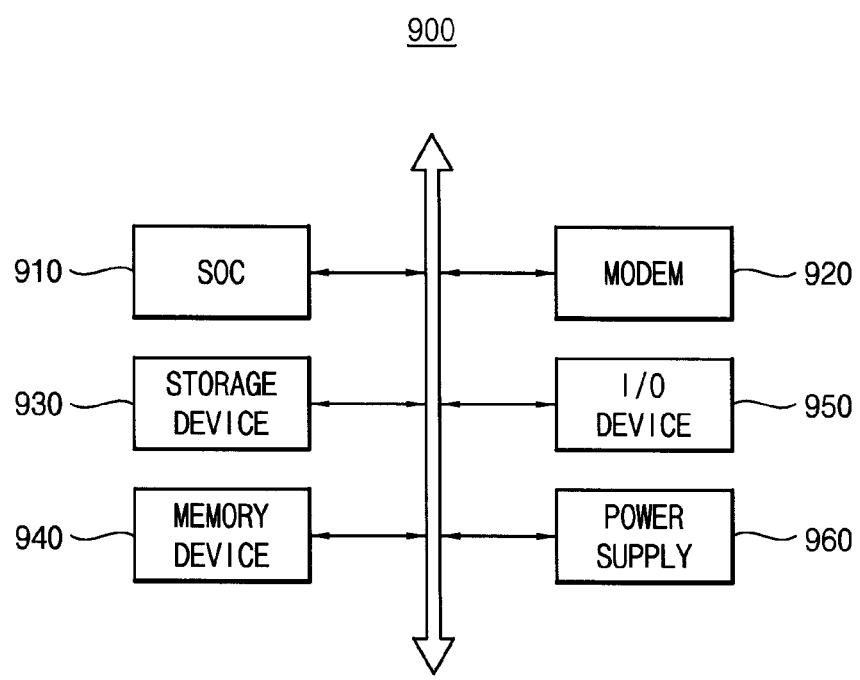
FIG. 13 is a block diagram illustrating a computing system, according to an example embodiments.

FIG. 13 is a block diagram illustrating a computing system, according to an example embodiment.

Referring to FIG. 13, a computing system 900 includes a system-on-chip SOC 910, a modem 920, a storage device 930, a memory device 940, an input/output device 950 and a power supply 960, according to an exemplary embodiment.

The system-on-chip 910 controls overall operations of the computing system 900.

The modem 920 communicates data with an external device through a wired or wireless communication.

The system-on-chip 910 communicates the data with the modem 920 in synchronization with one of a first clock signal, which has a relatively high frequency, and a second clock signal, which has a relatively low frequency, based on an operation mode.

The system-on-chip 910 may not incur a glitch while performing a clock switch operation on the first clock signal and the second clock signal. Therefore, the system-on-chip 910 may effectively switch between a high speed mode and a low speed mode without an operation error.

The system-on-chip 910 included in the computing system 900 of FIG. 13 may be implemented with the system-on-chip 300 of FIG. 12.

The storage device 930 stores data received from the external device through the modem 920 and data to be transferred to the external device through the modem 920. The storage device 930 may include a non-volatile memory device such as a flash memory device, a solid state drive (SSD), a hard disk drive (HDD), etc.

The memory device 940 stores data required for an operation of the computing system 900. The memory device 940 may include a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 950 may include a touch screen, a keypad, a keyboard, a mouse, a printer, etc. The power supply 960 may supply an operational power.

Although it is not illustrated in FIG. 13, the computing system 900 may further include ports that communicate with a video card, a sound card, a memory card, a universal serial bus (USB) device, or other electronic devices.

The system-on-chip 910 may communicate with the storage device 930, the memory device 940 and the input/output device 950 via an address bus, a control bus, and/or a data bus. According to an example embodiment, the system-on-chip 910 may be coupled to an extended bus, such as a peripheral component interconnection (PCI) bus.

The computing system 900 may be any computing system including the system-on-chip 910. For example, the computing system 900 may include a digital camera, a mobile phone, a smart phone, a laptop computer, a portable multimedia player (PMP), a personal digital assistant (PDA), etc.

The computing system 900 and/or components of the computing system 900 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multichip package (MCP), wafer-level fabricated package (WFP), or wafer-level processed stack package (WSP).

The foregoing is illustrative of the inventive concept and is not to be construed as limiting thereof. Although a few example embodiments have been described, those skilled in the art will readily appreciate that many modifications are possible in the example embodiments without materially departing from the novel teachings and advantages of the inventive concept. Accordingly, all such modifications are intended to be included within the scope of the inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A clock switch device, comprising:
a controller configured to set a clock switch period in response to a logic level of a mode signal; and
a switching circuit configured to:
receive a first clock signal, a second clock signal, and an auxiliary clock signal from one or more external devices;
before the clock switch period, output one clock signal among the first clock signal and the second clock signal as a glitch free clock signal; during the clock switch period, stop outputting the one clock signal, and output the auxiliary clock signal as the glitch free clock signal; and after the clock switch period, stop outputting the auxiliary clock signal, and output the other clock signal among the first clock signal and the second clock signal as the glitch free clock signal,
wherein the one clock signal is different from the other clock signal, and wherein at least one of the first clock signal and the second clock signal does not toggle during the clock switch period.

2. The clock switch device of claim 1, wherein the controller is configured to:
activate a first selection signal during the clock switch period in response to the logic level of the mode signal;
change a logic level of a second selection signal while the first selection signal is activated; and
generate a switch control signal based on the logic level of the mode signal.

3. The clock switch device of claim 2, wherein the controller is configured to:
maintain the switch control signal in a deactivated state in response to the mode signal; and
activate the switch control signal during the clock switch period.

4. The clock switch device of claim 2, wherein the controller is configured to generate the first selection signal, the second selection signal, and the switch control signal in synchronization with the auxiliary clock signal.

5. The clock switch device of claim 1, wherein the switching circuit includes:
a first multiplexer configured to output one of the first clock signal and the second clock signal as a mux clock signal; and
a second multiplexer configured to output one of the mux clock signal and the auxiliary clock signal as the glitch free clock signal.

6. The clock switch device of claim 5, wherein the second multiplexer stops outputting the mux clock signal during the clock switch period, and stops outputting the auxiliary clock signal after the clock switch period.

7. The clock switch device of claim 5, wherein the second multiplexer includes a feedback circuit configured to provide a trigger signal to the controller.

8. The clock switch device of claim 5, wherein the controller is configured to activate a first selection signal during the clock switch period in response to the logic level of the mode signal, and
wherein the second multiplexer is configured to:
in a state of the first selection signal being activated, stop outputting the mux clock signal when the mux clock signal is at a logic low level, and output the auxiliary clock signal as the glitch free clock signal when the auxiliary clock signal is at a logic low level; and
in a state of the first selection signal being deactivated, stop outputting the auxiliary clock signal when the auxiliary clock signal is at the logic low level, and output the mux clock signal as the glitch free clock signal when the mux clock signal is at a logic low level.

9. The clock switch device of claim 8, wherein the second multiplexer includes:
a first synchronizer configured to generate a mux clock enable signal by delaying an inverted version of the first selection signal in synchronization with the mux clock signal; and
a second synchronizer configured to generate an auxiliary clock enable signal by delaying the first selection signal in synchronization with the auxiliary clock signal.

10. A system-on-chip (SoC), comprising:
a first clock signal generator configured to generate a first clock signal;
a second clock signal generator configured to generate a second clock signal, a frequency of the second clock signal being different from a frequency of the first clock signal;
a clock switch device configured to:
set a clock switch period in response to a logic level of a mode signal;
receive an auxiliary clock signal from one or more external devices;
before the clock switch period, output one clock signal among the first clock signal and the second clock signal as a glitch free clock signal;
during the clock switch period, stop outputting the one clock signal, and output the auxiliary clock signal as the glitch free clock signal; and
after the clock switch period, stop outputting the auxiliary clock signal, and output the other clock signal among the first clock signal and the second clock signal as the glitch free clock signal; and
a processing block configured to operate in synchronization with the glitch free clock signal,
wherein the one clock signal is different from the other clock signal, and wherein at least one of the first clock signal and the second clock signal does not toggle during the clock switch period.

11. The SoC of claim 10, wherein the clock switch device includes a controller configured to set the clock switch period.

12. The SoC of claim 11, wherein the controller is configured to:
activate a first selection signal during the clock switch period in response to the logic level of the mode signal;
change a logic level of a second selection signal while the first selection signal is activated; and
generate a switch control signal based on the logic level of the mode signal.

13. The SoC of claim 12, wherein the controller is configured to generate the first selection signal, the second selection signal, and the switch control signal in synchronization with the auxiliary clock signal.

14. The SoC of claim 10, wherein the clock switch device includes a switching circuit configured to receive the auxiliary clock signal and to output the glitch free clock signal.

15. The SoC of claim 14, wherein the switching circuit includes:
a first multiplexer configured to output one of the first clock signal and the second clock signal as a mux clock signal; and a second multiplexer configured to output one of the mux clock signal and the auxiliary clock signal as the glitch free clock signal.

16. The SoC of claim 15, wherein the second multiplexer stops outputting the mux clock signal during the clock switch period, and stops outputting the auxiliary clock signal after the clock switch period.

17. A system-on-chip (SoC) comprising:
a first clock signal generator configured to generate a first clock signal;
a second clock signal generator configured to generate a second clock signal, a frequency of the second clock signal being different from a frequency of the first clock signal;
a clock switch device configured to set a clock switch period in response to a logic level of a mode signal, and to receive an auxiliary clock signal from an external device, the clock switch device including:
 a first multiplexer configured to output one clock signal among the first clock signal and the second clock signal as a mux clock signal before the clock switch period, and output the other clock signal among the first clock signal and the second clock signal as the mux clock signal after the clock switch period; and
 a second multiplexer configured to output the auxiliary clock signal as a glitch free clock signal during the clock switch period, and output the mux clock signal as the glitch free clock signal before the clock switch period and after the clock switch period; and
a processing block configured to operate in synchronization with the glitch free clock signal,
wherein the one clock signal is different from the other clock signal, and
wherein at least one of the first clock signal and the second clock signal does not toggle during the clock switch period.

18. The SoC of claim 17, wherein the second multiplexer stops outputting the mux clock signal during the clock switch period, and stops outputting the auxiliary clock signal after the clock switch period.

19. The SoC of claim 17, wherein the clock switch device includes a controller configured to set the clock switch period.

20. The SoC of claim 19, wherein the controller is configured to:
activate a first selection signal during the clock switch period in response to the logic level of the mode signal;
change a logic level of a second selection signal while the first selection signal is activated; and
generate a switch control signal based on the logic level of the mode signal.

* * * * *